Figure 1:
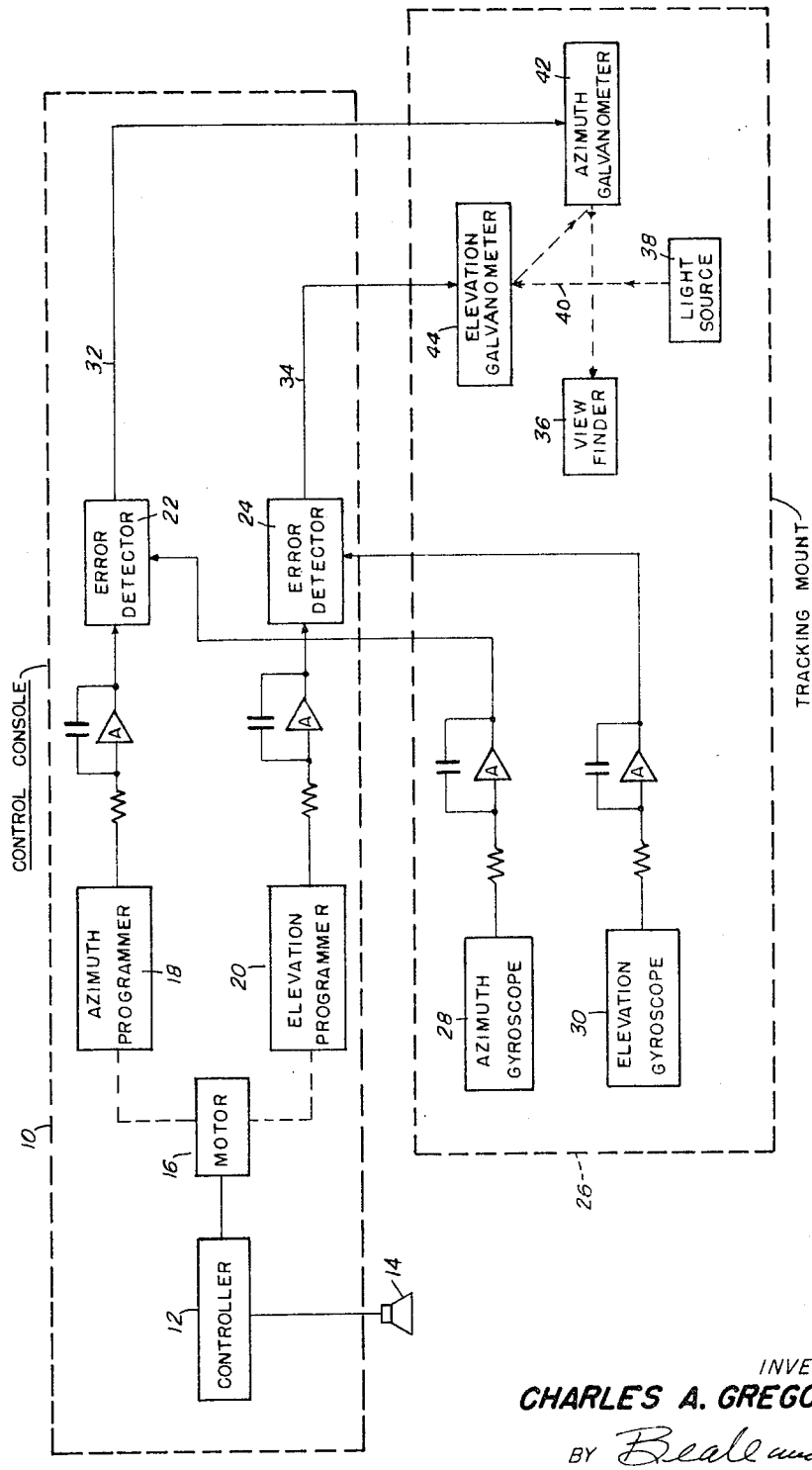

Oct. 18, 1966 C. A. GREGORY, JR 3,280,243
MISSILE TRACKING SIMULATOR AND TRAINER
Filed April 22, 1964 2 Sheets-Sheet 1

INVENTOR
CHARLES A. GREGORY, JR.
BY Beale and Jones
ATTORNEYS

INVENTOR
CHARLES A. GREGORY, JR.
BY Beale and Jones
ATTORNEYS

3,280,243
MISSILE TRACKING SIMULATOR AND TRAINER
Charles A. Gregory, Jr., Henrico County, Va., assignor to Giannini Scientific Corporation, a corporation of Delaware
Filed Apr. 22, 1964, Ser. No. 361,814
13 Claims. (Cl. 35—10.4)

This invention relates to missile tracking systems, and more particularly to a system for simulating the flight of a missile to enable tracking station operators to gain experience in following the image of a missile during its launch and flight.

The tracking camera mounts presently in use are extensively modified M-45 type powered machine gun mounts. Each mount basically is comprised of a stabilized trailer, an azimuth rotating assembly, and an elevation assembly. The azimuth assembly contains an operator's cockpit and hand controls, while the elevation assembly consists of the operator's tracking view finder, long focal length lenses and high speed cameras.

In the use of the tracking camera mounts the operator manipulates a control handle, causing the optical line of sight of the lenses, cameras and the tracking view finder to traverse in azimuth and/or elevation. The control handle motion introduces mechanical signals to the drive unit of the mount by a mechanical linkage. A specific displacement of the control handle causes acceleration of the mount until a specific continuing rate of motion is obtained.

The use of tracking camera mounts of this type to photograph the launchings and flights of various missiles subjects the mount operators to unique reaction and co-ordination tasks. Certain combinations of missile accelerations, velocities, trajectories, and the like, and proximity of the tracking mount stations to launching pads give rise to almost prohibitive reaction and coordination skill requirements for the trackers. In this situation, the more often an operator is exposed to a particular tracking problem, the more proficient he becomes in handling that situation. The experience so gained enables the tracking operator effectively to anticipate the proper mount control manipulations necessary to keep the image of the missile approximately centered in his tracking and recording optics during its launching and flight.

It is therefore an object of this invention to provide a device that will simulate various predetermined tracking problems and will function as a training aid for tracking camera operators.

It is a further object of this invention to provide a missile tracking simulator that may be considered an accessory to the tracking camera mount and will be suitable for use in the field by the tracking camera operator.

Another object of this invention is to provide a missile tracking simulator that may be easily mounted on and removed from a tracking camera mount and that will make no more than a minimum environmental change in the operator's normal surroundings.

It is a further object of this invention to provide a missile tracking trainer device which will present visually to the tracking camera operator, by way of the tracking mount view finder or representative device, an on-axis simulated image or representation of a launch and flight pattern of a missile.

According to the system of this invention, a pair of gyroscopes with potentiometer pick-offs are mounted on the M-45 tracking camera mount to generate feed-back voltages in accordance with the angle traversed by the mount. One gyro is located on the azimuth rotating assembly, while the other is located on the elevation assembly to provide voltages representing azimuth and elevation, respectively. The output voltages of these gyro pick-offs are proportional to azimuth and elevation velocity. Mounted externally of the mount is a control console containing azimuth and elevation programmers which store angular velocity information representing the angular velocity components of azimuth and elevation of the missile launch and flight to be simulated. A pair of error detectors are also provided in the control console to compare the programmed angle information with the feed-back angular information from the gyroscopes on the mount. Error signals from the detectors, one representing azimuthal errors in tracking and the other representing elevational errors, are fed to a pair of mirror galvanometers located on the tracking camera mount and arranged to deflect a collimated light beam into the view finder of the tracking camera. The galvanometer system is arranged to move the light beam vertically and/or horizontally from its null position in accordance with the magnitude and polarity of the error signal from the error detectors. Whenever the feed-back voltages from the tracking mount differ from the programmed voltages an error signal will be produced. As long as the operator manipulates the tracking mount in such a way as to follow the simulated flight pattern, the light beam will remain at the center of the view finder. If the simulated image moves away from the center of the tracking reticle the operator must move the tracking mount controls in a manner that normally would return an actual view of an accelerating missile to the center of the reticle. The movement of the tracking portions of the mount introduces a feed-back signal from the gyros to the simulator that adjusts the simulated image signal toward the center of the tracking reticle, i.e. toward the null position. In effect, the programmed signal is canceled by the operator reaction feed-back signal when the operator is able to react accurately.

Figure 2:
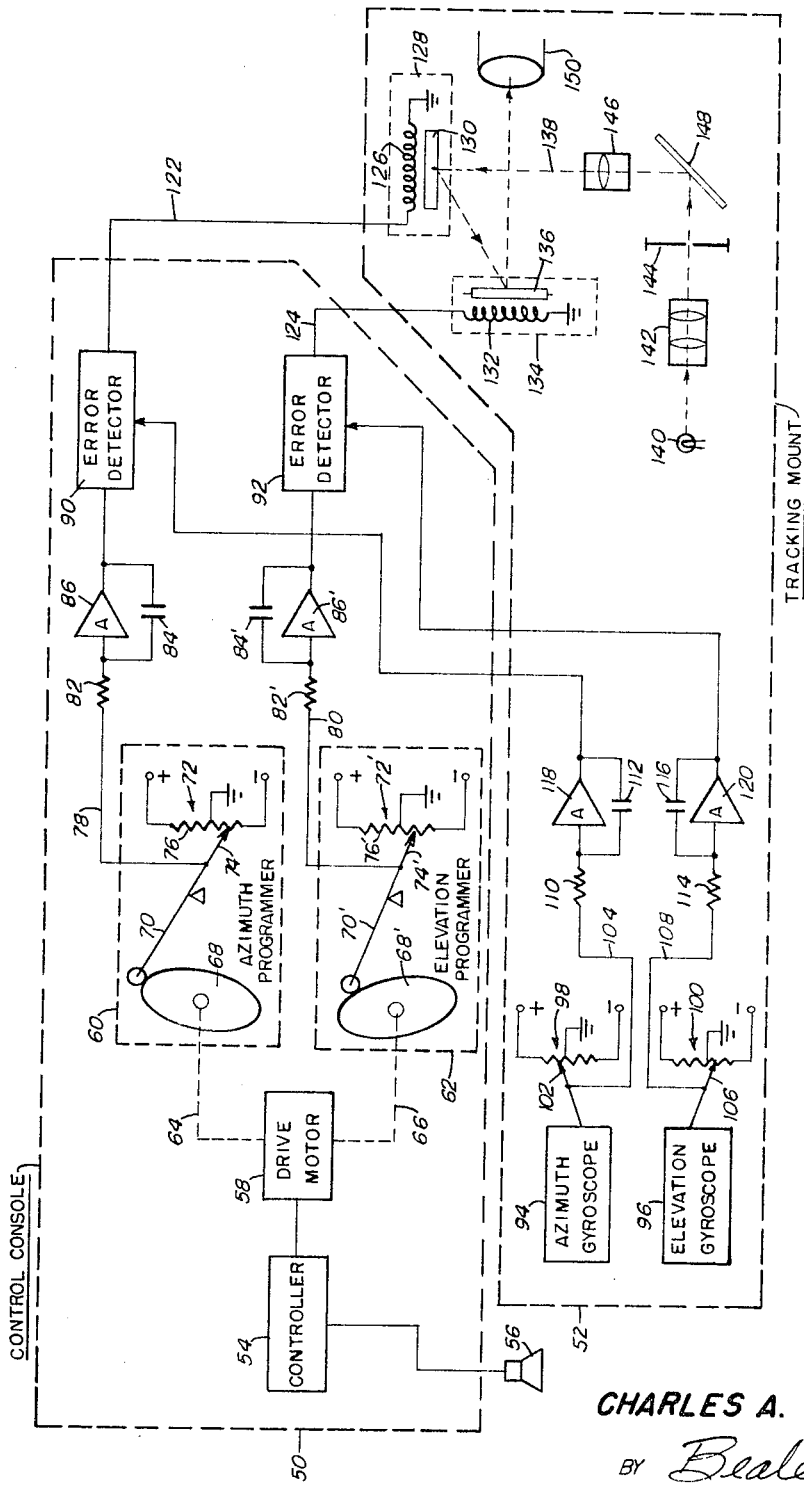

For a more complete description of the structure and operation of the system of the invention reference should now be made to the following specification taken in conjunction with the accompanying drawings in which:

FIG. 1 is a simplified functional block diagram of the system of the invention; and FIG. 2 is a more detailed showing of a preferred embodiment of the system.

Referring now to FIG. 1 of the drawings, there is illustrated at 10 a diagrammatic showing of a control console for the missile tracking simulator of the present invention. Included in the control console, which is located externally of the M-45 tracking camera mounting is a controller 12 which may be tape recorder having two tracks. The first track produces a voice count-down usch as that normally used prior to the launch time of a missile. The count-down is broadcast to the tracking camera operator through a loudspeaker 14. The second track of the tape recorder contains signals which are used to initiate the simulated launch. These signals activate the programmer motor 16 just before the "zero" count of the tape recorder count-down, thus initiating the programmer output to set up the system. The motor 16 drives both the azimuth programmer 18 and the elevation programmer 20 and these, in turn, produce output signals having predetermined functions representing the angular velocities of the simulated target, or missile, during its launching and subsequent flight. The output voltages from the azimuth and elevation programmers 18 and 20, which voltages are proportional to velocity, are amplified, integrated and fed to error detectors 22 and 24, respectively.

Mounted on the tracking camera mount, indicated generally at 26, are a pair of gyroscopes 28 and 30 which are designed to sense the horizontal and vertical motions of the tracking camera mount as it moves in response to the operator's command. Gyroscope 28 may be either permanently or removably located on the azimuth assembly of the camera, while gyroscope 30 is similarly located on the elevation assembly. The output voltages from the gyroscopes, which may be obtained from a potentiometer pick-off, are proportional to the angular velocity of the camera mount as the camera tracks the flight path of a missile. These voltages are integrated and amplified and then are fed to the error detectors 22 and 24.

The error detectors 22 ad 24 compare the output voltages of the programmers 18 and 20 with the voltages received from the gyroscopes 28 and 30. Whenever the output voltages from azimuth programmer 18 and azimuth gyroscope 28 differ in amplitude or polarity an error signal is produced on line 32 representative of this difference. Similarly when the outputs of programmer 20 and gyroscope 30 differ an output voltage appears on line 34. These voltage differences occur whenever the tracking camera 26 assumes an angular position other than that represented by the output voltages from programmers 18 and 20; that is, whenever the tracking camera fails accurately to follow the programmed flight path of the simulated missile.

In order to enable the operator of the tracking camera to follow the flight path of the simulated missile and to indicate to him whether or not he is accurately following the simulated flight path, an optical system is provided that will produce a movable spot of light representative of the missile in the view finder of the tracking camera. Such a view finder is indicated at 36. The optical system includes a light source 38 producing a collimated light beam 40 which is directed toward a mirror galvanometer 44, is reflected therefrom to a second mirror galvanometer 42 and thence to the view finder 36. The mirrors of galvanometers 42 and 44 are mutually perpendicular, the mirror of galvanometer 42 being arranged to rotate on a vertical axis and the mirror of galvanometer 44 rotating on a horizontal axis. When the galvanometers are at rest, i.e. in their null position, the light beam 40 falls in the center of the view finder 36. The error signals appearing on lines 32 and 34 are fed to galvanometers 42 and 44, respectively, and serve to rotate the mirrors of the galvenometers in a direction and by an amount proportional the polarity and the amplitude of the applied signals. The rotation of the galvanometer mirrors in response to the application of these signals causes the position of the beam 40 to shift with respect to the view finder 36. Since these error signals are proportional to the difference between the programmed angular position of the simulated missile and the actual position of the tracking camera, the motion of the light beam 40 similarly will be proportional to these errors and thus will provide the operator with a clear indication of the direction in which he must move the tracking camera in order to stay on target. By moving the tracking camera in a direction which will tend to bring the light spot back to the middle of the view finder, the operator will reduce the difference between the output voltage of the tracking gyros 28 and 30 and the programmers 18 and 20. This will reduce the voltage appearing on output lines 32 and 34, thus bringing the mirror galvanometers closer to their null positions and thus returning the light beam 40 toward the center of the view finder.

FIG. 2 of the drawings shows in diagrammatic form a preferred embodiment of the invention. As described with respect to FIG. 1, the system includes a control console 50 and a tracking camera mount 52. Included in the control console 50 is a controller 54 which is preferably a tape recorder but which may be any suitable means for initiating the operation of the system. The tape recorder includes a two-track tape, one track carrying a voice recording of a count down, i.e., 10, 9, 8, etc. to 0, while the other track carries a signal which will activate the programmer drive motor 58 just prior to the zero count on the first track. A loudspeaker 56 is provided to carry the count down to the operator of the tracking camera. Upon activation, the motor 58 drives programmers 60 and 62 by means of mechanical linkages 64 and 66, respectively.

Azimuth programmer 60 comprises, in its preferred form, a rotating cam 68, a cam follower 70 and a movable arm potentiometer 72. The movable arm 74 of the potentiometer is connected to the cam follower 70 for motion therewith. The cam 68 has a peripheral surface that is shaped in accordance with the predetermined desired path to be followed by a simulated missile in azimuth. As the cam 68 rotates, the cam follower 70 will cause the movable arm 74 to slide along the resistor 76 of the potentiometer, producing a variable output of voltage on line 78 that is representative of the angular velocity components of azimuth, or, what is the same, the rate of change of position of the simulated target, for the simulated flight path.

The elevation programmer 62 is similar in construction to programmer 60, and is comprised of a rotating cam 68', cam follower 70'; potentiometer 72', movable arm 74' and potentiometer resistor 76'. Programmer 62 provides an output voltage on line 80 which is representative of the angular velocity component of elevation, or positional rate of change, for the simulated flight path.

The cams 68 and 68' are replaceable and it is contemplated that a number of pairs be provided with the tracking simulator. Each pair may be manufactured to represent the angular velocity of various predetermined launching and flight patterns. Thus by merely changing the cams a different tracking pattern may be provided, giving the operator experience and training in the operation of the tracking camera under varying conditions.

It will be apparent to those skilled in the art that the programmers 60 and 62 may be in the form of tape recorders, punched tapes, punched cards or other suitable information storage media rather than the cam system shown in FIG. 2. These storage media serve to program the simulator as to the specific missile launch angle, early acceleration, velocity, trajectory, etc. as viewed from a specific tracking mount station.

The velocity signals appearing on lines 78 and 80 pass through the integrator networks 82, 84, and 82', 84', and the amplifiers 86 and 86' and are applied to the error detectors 90 and 92, respectively. The amplifiers 86 and 86' may be conventional D.C. amplifiers of suitable design, such as the Philbrick Model P 65A solid state Operational Amplifier, manufactured by Philbrick Researches, Inc., of Boston, Mass. Since the inputs to the integrating networks are velocity signals, it will be apparent that the integrated signals will represent the programmed angular position in azimuth and elevation of the simulated target.

Azimuth gyroscope 94 and elevation gryroscope 96 are attached to the azimuth and elevation assemblies, respectively, of the tracking camera mount 52, and are provided with potentiometer pick-offs 98 and 100. Azimuth gyroscope 94 mechanically drives the movable arm 102 of potentiometer 98 in response to azimuthal motion of the tracking camera mount, providing an output voltage on line 104 that is proportional to the angular velocity of the camera mount in azimuth. Similarly, the movable arm 106 of potentiometer 100 is driven by the gyro 96 in response to elevational motion of the tracking mount to produce an output voltage on line 108 representing the elevational velocity of the mount. The angular velocity signals appearing on lines 104 and 108 are passed through integrating networks 110, 112 and 114, 116 respectively, are amplified by amplifiers 118 and 120 and are fed to the error detectors 90 and 92, respectively. Here again, the integrated signals represent actual azimuth and elevation of the tracking mount as it moves to follow the simulated target. The gyroscopes 94 and 96 are of conventional design and any suitable gyroscope may be used. The amplifiers 118 and 120 are also of conventional design. The error detectors 90 and 92 receive the integrated and amplified signals from the programmers 60, 62 and from the gyroscopes 94, 96, which signals are representative of the angular position of the simulated missile and of the angular position of the tracking camera mount.

The signals representing the angular position in azimuth are applied to error detector 90, where they are compared and an output voltage generated which is proportional in amplitude and polarity to the difference, i.e., to the deviation of the tracking mount position from the programmed azimuthal position. This error signal appears on line 122. The integrated and amplified signals representing angular position in elevation of the target and of the tracking camera mount are applied to error detector 92 which produces an output voltage on line 124 proportional in amplitude and polarity to the difference between these two input signals. Error detectors 90 and 92 are of conventional design and any such network which will produce an output voltage proportional in amplitude and polarity to the difference of the input voltages will be suitable.

The error voltage appearing on line 122 is applied to the actuating coil 126 of a mirror galvanometer shown diagrammatically at 128. The mirror 130 is mounted, for example, on a vertically extending axis and rotates in a direction and in an amount that is proportional to the polarity and amplitude of the current in coil 126. Similarly, the error voltage appearing on line 124 is fed to actuating coil 132 of a second mirror galvanometer illustrated diagrammatically at 134. The mirror 136 of this galvanometer is mounted, for example, on a horizontally extending axis and rotates in a direction and in an amount proportional to the current in coil 132.

In order to produce the desired image of the simulated missile, a source of light 140 is provided. Light beam 138 from this source is passed through condensing lens 142, reticle 144 and is deflected through a collimating lens 146 to the galvanometer mirrors by a fixed mirror 148. The collimated light beam is reflected by the mirrors 130 and 136 to the view finder 150 normally associated with the tracking camera. Such a view finder would normally be a pair of 7×50, 9×63 or 20×120 binoculars or the like. The deflection of galvanometers 128, 134 caused by the error voltages on lines 122 and 124 will move the collimated beam away from its null point position to indicate to the operator the direction and magnitude of his tracking error.

By using a galvanometer to insert the image of the illuminated reticle 144 into the objective lens of the tracking binoculars the system is made compatible with field of view binoculars with no change in the gain of the galvanometer system. The "cross galvanometers," one for azimuth deflection and the other for elevation deflection, are placed close to the objective lens in one of the binocular telescopes in such a manner as not to obscure the entire area of the lens so that the operator will see the distant background as well as the spot of light representing the missile flight path. Since the light deflected from the galvanometer mirror is collimated light, the reticle is seen at infinity. The deflection of this collimated light beam is the true angular error of tracking.

If desired, a cathode ray tube indicator system could be substituted for the galvanometer system shown in FIG. 2. However, the galvanometer system is more reliable for field use and is therefore the preferred solution.

Although the foregoing specification sets forth the preferred embodiment of the missile tracking simulator and trainer, various modifications will be apparent to those skilled in the art; it is therefore desired that the foregoing description be taken as illustrative and limited only by the following claims.

What is claimed is:

1. A missile tracking simulator for producing in the optical viewing means of a camera tracking mount a predetermined visual representation of the launch and flight pattern of a missile, comprising:
    (a) azimuth sensing means and elevation sensing means mounted on said camera tracking mount to sense the horizontal and vertical motion of said mount and provide electrical output signals proportional in amplitude and polarity to the azimuthal and elevational velocities of said mount:
    (b) azimuth programmer means for generating an electrical signal representing the flight path in azimuth of a missile;
    (c) elevation programmer means for generating an electrical signal representing the flight path in elevation of a missile;
    (d) first error detection means for comparing the output signal from said azimuth sensing means with the signal generated by said azimuth programmer means, said first error detection means producing a first error signal having amplitude and polarity corresponding to the difference between said azimuth signals;
    (e) second error detection means for comparing the output signal from said elevation sensing means with the signal generated by said elevation programmer means, said second error detection means producing a second error signal having amplitude and polarity corresponding to the difference between said elevation signals;
    (f) a source of collimated light;
    (g) and optical means responsive to said first and second error signals to direct said light into the optical viewing means of said camera tracking mount, the motion of said light in response to said error signals representing the error in tracking a simulated missile launch and flight.

2. The simulator of claim 1 wherein said azimuth sensing means and said elevation sensing means are gyroscopes having potentiometer pick-offs.

3. The simulator of claim 1 wherein said azimuth and elevation programmer means each comprises a rotating cam of predetermined shape, a cam follower and a movable arm potentiometer, the movable arm of said potentiometer being connected to the cam follower for motion therewith, and a source of voltage connected across said potentiometer, the output signal from each programmer being taken from the movable arm of its corresponding potentiometer, said output signals varying in accordance with the motion of said movable arm.

4. The simulator of claim 1 wherein said optical means comprises first and second mirror galvanometers responsive to said first and second error signals, respectively, the mirrors of said mirror galvanometers being arranged to rotate about mutually perpendicular axes in directions and magnitudes corresponding to the polarity and amplitude of the corresponding error signals.

5. The simulator of claim 3, wherein said rotating cams are replaceable so as to permit simulation of any desired launch and flight pattern.

6. In a tracking simulator for use with a tracking mount,
    (a) program means for developing first and second programmed electric signals representing the azimuthal and elevational velocities of the path of a simulated target;
    (b) sensing means responsive to the velocity of said tracking mount in azimuth and elevation for producing third and fourth electric signals in accordance with the azimuthal and elevational velocities, respectively, of said tracking mount;
    (c) means for comparing the electric signals produced by said program means and by said sensing means to obtain distinct azimuth and elevation error signals representing the differences between the azimuth and elevation velocity signals of said program means and the corresponding azimuth and elevation velocity signals of said tracking mount; and (d) indicator means responsive to said error signals for displaying said differences.

7. The tracking simulator of claim 6, wherein said program means is remote from said tracking mount and comprises a pair of rotatable cams, a pair of cam followers and a first pair of movable-arm potentiometers, each of said cams being connected through a corresponding cam follower to the movable arm of a corresponding potentiometer, each cam being shaped to vary the electrical output of its corresponding poteniometer in accordance with a predetermined tracking pattern to produce said first and said second programmed electrical signals, integrating means for each said programmed electrical signal, and means for applying said integrated first and second signals to said means for comparing.

8. The tracking simulator of claim 7, wherein one of said pair of cams represents elevational changes and the other of said pair of cams represents azimuthal changes in the path of said simulated target.

9. The tracking simulator of claim 6, wherein said sensing means comprises an azimuth and an elevation gyroscope carried by said tracking mount, a pair of movable-arm potentiometers, each of said gyroscopes driving the movable arm of a corresponding potentiometer to provide said third and fourth electrical signals, integrating means for said third and fourth electrical signals, and means for applying said integrated third and fourth signals to said means for comparing.

10. The tracking simulator of claim 6, wherein said indicator means comprises a pair of mutually perpendicular mirror galvanometers.

11. The tracking simulator of claim 8, wherein said sensing means comprises an azimuth and an elevation gyroscope carried by said tracking mount, a second pair of movable-arm potentiometers, each of said gyroscopes driving the movable arm of a corresponding potentiometer to provide said third and fourth electrical signals, integrating means for said third and fourth electrical signals, and means for applying said integrated third and fourth signals to said means for comparing.

12. The tracking simulator of claim 11, wherein said means for comparing comprises first and second comparators, said first comparator producing error signals representing the amplitude and polarity of the difference between said first and said third electric signals to provide said azimuth error signal and said second comparator producing error signals representing the amplitude and polarity of the difference between said second and said fourth electric signals to provide said elevation error signal.

13. The tracking simulator of claim 12, wherein said indicator means comprises first display means responsive to said azimuth error signal and second display means responsive to said elevation error signal, said first and second display means acting together to indicate any deviation in the motion of said tracking mount from the predetermined path of said simulated target.

References Cited by the Examiner

UNITED STATES PATENTS

| | | | |
|---|---|---|---|
| 2,965,979 | 12/1960 | Holzer | 88—1 |
| 2,968,997 | 1/1961 | Newton et al. | 89—41 |
| 3,026,615 | 3/1962 | Aubert | 35—25 |

CHESTER L. JUSTUS, *Primary Examiner.*

MAYNARD R. WILBUR, *Examiner.*

T. H. TUBBESING, *Assistant Examiner.*